(12) United States Patent
Simeone

(10) Patent No.: US 6,595,013 B1
(45) Date of Patent: Jul. 22, 2003

(54) SOUND ATTENUATOR FOR A REFRIGERATION UNIT

(75) Inventor: Robert S. Simeone, Bridgeport, NY (US)

(73) Assignee: Carrier Corporation, Farmington, CT (US)

(*) Notice: Subject to any disclaimer, the term of this patent is extended or adjusted under 35 U.S.C. 154(b) by 0 days.

(21) Appl. No.: 10/082,585

(22) Filed: Feb. 25, 2002

(51) Int. Cl.[7] .......................... F25B 27/00; F25D 19/00
(52) U.S. Cl. .......................... 62/115; 62/323.1; 62/296; 181/229
(58) Field of Search .................. 62/239, 296, 323.1, 62/115; 123/184.57; 181/229, 265

(56) References Cited

U.S. PATENT DOCUMENTS 3,692,100 A * 9/1972 Gallagher, Jr. .............. 165/256
3,782,628 A * 1/1974 Beaudet .................. 237/12.3 C

* cited by examiner

Primary Examiner—William E. Tapolcai
(74) Attorney, Agent, or Firm—Wall Marjama & Bilinski LLP

(57) ABSTRACT

A sound suppression system for suppressing the noise of an engine within an enclosure of an outdoor unit for a transport refrigeration system. A resonator is provided to suppress noise caused by the inflow of air to the air intake manifold of the engine, and a sound panel is provided in the bottom wall of the enclosure to suppress noise emanating from the engine. The resonator and the sound panel are co-located in the same plane and are preferably integrally formed of a molded plastic material.

15 Claims, 4 Drawing Sheets

SOUND ATTENUATOR FOR A REFRIGERATION UNIT

BACKGROUND OF THE INVENTION

This invention relates generally to mobile refrigeration units and, more particularly, to a sound attenuation method and apparatus for a refrigeration unit powered by an internal combustion engine.

One well known method of transporting perishable goods is by way of a truck or trailer having a container which is refrigerated by way of an attached refrigeration unit. The refrigeration unit has an internal evaporator coil portion and an external portion that contains a condenser coil, a compressor, and an engine for driving the compressor. Since the engine is relatively loud when operating, it is important to suppress the sound from emanating to the surrounding area as much as is practicable. This is particularly true such as when, for example, the truck/trailer is parked for the night, since the truck/trailer may be in a residential or otherwise populated area.

In such a refrigeration system, there are commonly two methods for limiting the sound emanating therefrom. First, the compartment containing the internal combustion engine is closed as much as possible from the outside, and sound attenuating material is placed at various locations within the containing structure. Secondly, in order to attenuate the sound of air passing to the intake manifold of the engine by way of the air cleaner, a resonator is provided. A resonator is typically a cylindrical shaped "dead air space" or tin can that is fluidly connected to the intake manifold, and is placed somewhere in the containing structure. Whereas the particular location is not important, there is a desire to conserve and effectively use the available space within the containing structure.

It is therefore an object of the present invention to provide an improved sound attenuation system for a mobile transport refrigeration system.

Another object of the present invention is to provide a suitable structure for attenuating both the sound of an internal combustion engine and the sound of air entering the inlet manifold thereof.

Another object of the present invention is the provision for effectively using the available space and for reducing the number of components included in the sound attention component.

Briefly, the objects of the present invention are attained by the use of a single structure that combines the elements of a resonator and a sound attenuating wall in one extremity of the containing structure. In this way, the available space is very effectively used and the number of components is reduced.

In the preferred embodiment of the invention, a single plastic component is formed of both a tubular resonator portion located in a plane, and a planer portion is integrally attached to the resonator so as to form an extension thereof in the same plane.

In accordance with a further aspect of this invention, the single component is comprised of a resonator portion and a planer portion. The two plastic halves are vacuum molded together to form the final single component that is placed in one wall of the containing structure for the outdoor unit.

The above, and other objects, features and advantages of the present invention will become more apparent from the following description when read in conjunction with the accompanying drawings.

DESCRIPTION OF PREFERRED EMBODIMENT

Figure 1:
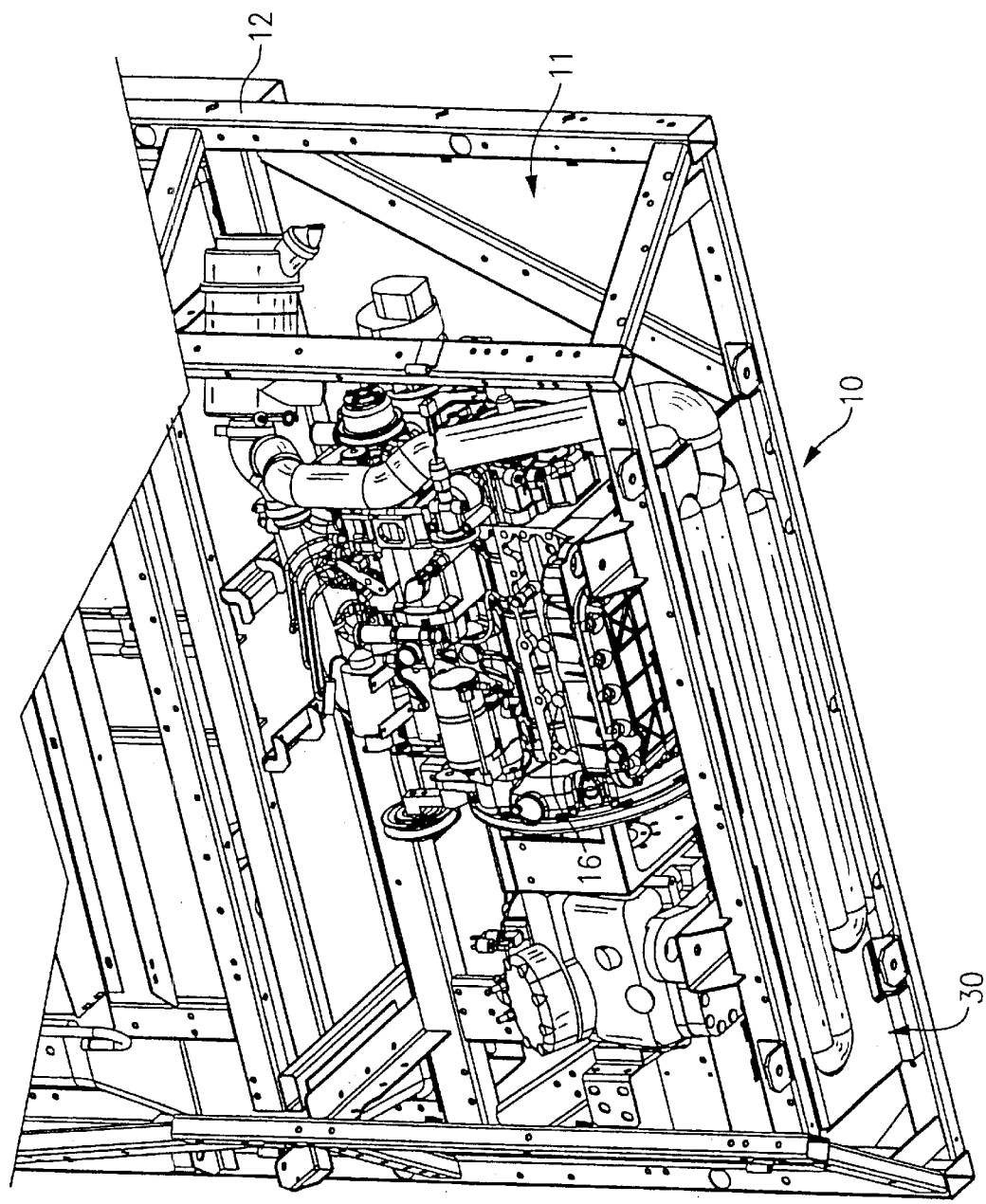
FIG. 1 is a partial perceptive view of an outdoor refrigeration unit with the present invention incorporated therein.

Referring now to FIG. 1 the invention is shown generally at 10 as incorporated into a lower section 11 of a frame 12 which is adapted for mounting on the outside of a transportable refrigerated container such as a truck or trailer or the like.

An upper section 13 of the frame 12 contains a condenser coil which, together with the components within the lower section 11 comprise the high pressure side of a refrigeration system for maintaining a predetermined temperature within the transportable container. The low pressure side of the refrigeration system includes an evaporator coil and cool air distribution system which is located on the inner side of the container (not shown).

Mounted in frame lower section 11 is an internal combustion engine 16, such as a diesel engine, and a refrigeration compressor 17 which is drivingly attached to the engine 16. During periods in which a temperature sensor in the container indicates that the container is at a higher temperature then desired, the engine 16 is operating at a relatively fixed speed to drive the compressor 17 in order that the refrigerant will be cycled through the refrigeration system to cool the container. Generally, the system is adapted for two speed operation, i.e., either at a relatively high speed or a relatively low speed, depending on the demands (i.e., the difference between the desired temperature and the actual sensed temperature in the container).

The engine 16 includes an air intake manifold 18 for channeling air into the cylinders of the engine 16 for combustion purposes. Attached to the air intake manifold 18 is a Y fixture 19 having a non-bifurcated end 21 fluidly attached to an air cleaner 22 which in turn, is adapted to receive ambient air into its other end. At the other end of the Y fixture 19 is a pair of legs 23 and 24. The leg 23 fluidly connects the air cleaner 22 to the air intake manifold 18, and leg 24 fluidly connects the air cleaner 22 to an input end 27 of a resonator 28. The resonator 28 operates in a conventional manner to attenuate the noise that would otherwise by caused by the flow of intake air into the intake manifold 18.

Figure 2:
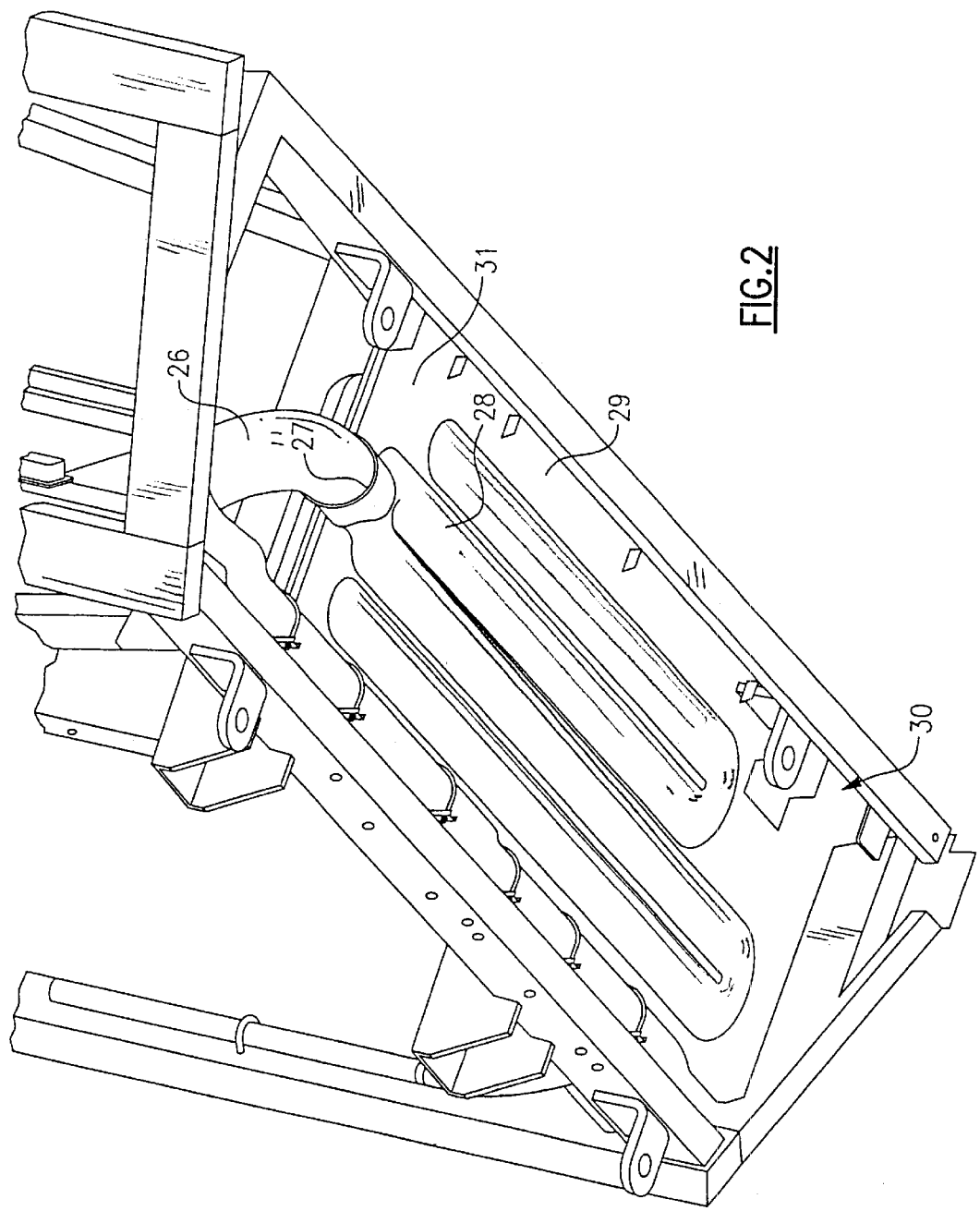
FIG. 2 is a partial perceptive view of the resonator/sound attenuating panel portion thereof.
Figure 3:
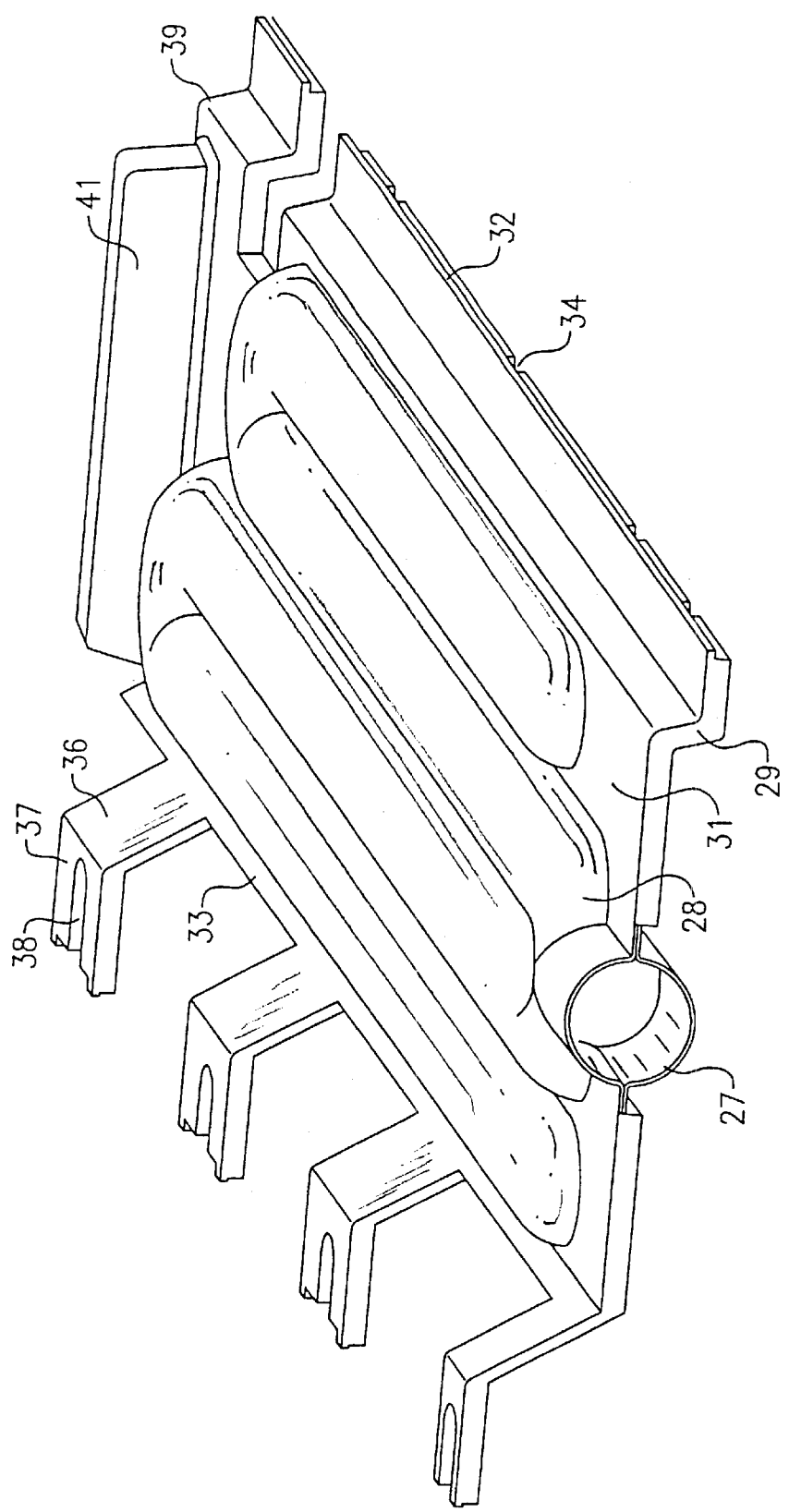
FIG. 3 is another perceptive view of the resonator/sound attenuator panel in its unassembled form.
Figure 4:
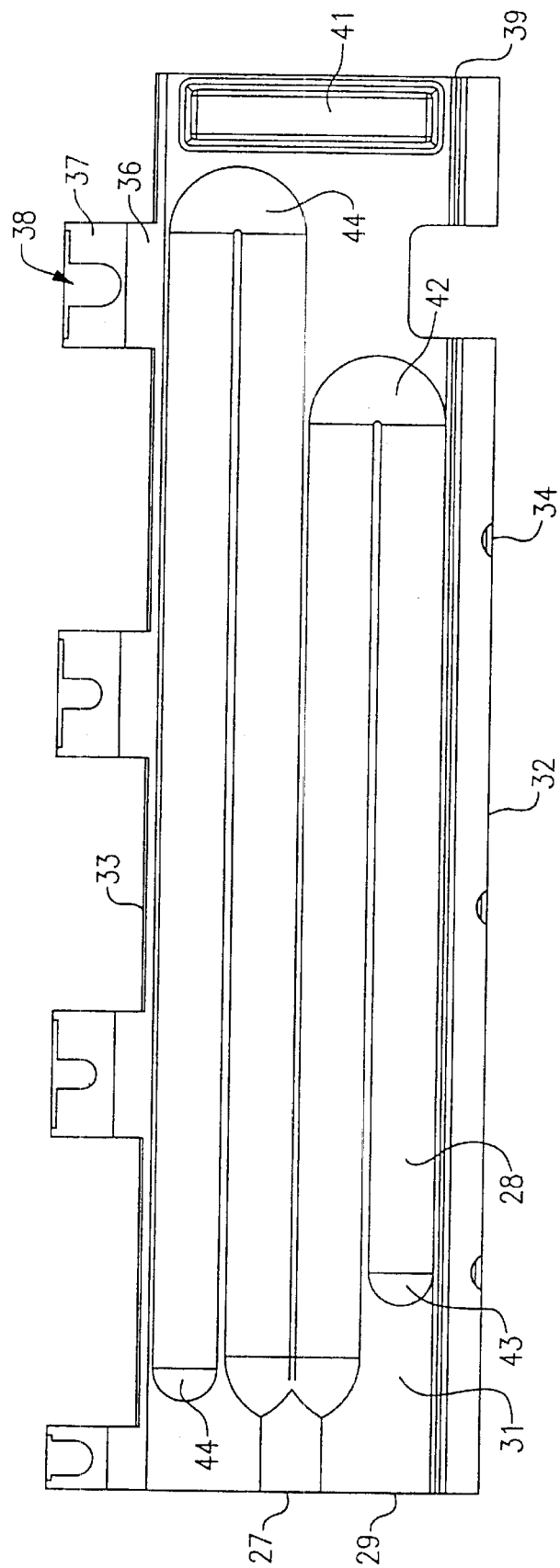
FIG. 4 is a top view of the resonator/sound attenuator panel in accordance with the present invention.

Referring now to FIGS. 2–4, there is shown a lower panel 29 which is mounted in a lower opening 30 of the frame 12 so as to close that lower opening 30 for purposes of isolating the motor noise within the frame 12.

The lower panel 29 comprises a single element that is integrally formed of the resonator portion 28 and a surrounding planar portion 31. The lower panel is made of a high strength, low weight plastic material, and is preferably formed by way of vacuum molding process. That is, a pair of halves, with each half being essentially the mirror image of the other and being of a thickness which is one half the thickness of the lower panel 29 as shown, are separately formed. The two halves are then put together in a clam shell fashion and vacuum molded together such that the two halves are fused into a single integral structure. Such a structure provides the tubular resonator portion 28 which is surrounded by, and integrally formed with the planar portion 31 which functions to close the bottom opening 30 and attenuate the nosie that would otherwise emanate therethrough.

The lower panel 29 is fastened to the frame 12 at its two sides 32 and 33 by a fastener or the like. At side 32, there are a plurality of indents 34 through which fasteners are passed and secured to frame 12. At the other side 33, there are a plurality of flanges 36 extending obliquely upwardly and having integrally attached thereto a generally horizontal extension 37 having a slot 38 formed therein. A fastener is passed through slot 38 that engages with supporting structure on frame 12.

At the end 39 opposite the input end 27 there is provided a an upwardly extending barrier structure 41 which functions to seal off an end area that would otherwise be open to the emanation of noise from the area above the panel 29 to an end cavity.

The lower panel 29 thus serves the purpose of attenuating sound in two ways. It serves to position the resonator 28 which attenuates the sound of the incoming air to the inlet manifold 18, and it also serves as a bottom cover to prevent the engine noise from traveling downwardly through the bottom end of the frame 12.

It will be seen in FIGS. 1–4 that the resonator 28 includes two sides on each of the inputs ends 27. Side 42 has a pair of shorter tubes with a closed end 43, whereas side 45 has a pair of longer tubes with a closed end 45. Each of these sides 42 and 44 is designed to accommodate the attenuation of sound that results from a predetermined engine speed. That is, generally, the shorter side 42 is sized such that when the engine is operating at the relatively slow speed, this side is effective in attenuating the sound of the incoming air into the manifold 18. The longer side 44 is similarly tuned to be effective in attenuating the sound of the incoming air when the engine is operating at the relatively higher speed. During the period when one side is responsive to the particular speed of the engine the other side is essentially nonfunctional in that it does little to attenuate the sound, but is not necessary because of the sound characteristics of that particular speed.

Having described a preferred embodiment of the invention with reference to the accompanying drawings, it is understood that the invention is not limited to that precise embodiment, and various changes and modifications may be effected therein by one skilled in the art without departing from the scope or spirit of the invention as defined in the appended claims.

I claim:

1. An air conditioner system for a mobile temperature controlled container, comprising:
    a frame for attachment to the temperature controlled container and for support of components of the system including a heat exchanger coil, a compressor and an internal combustion engine secured to said frame and drivingly connected to said compressor, said engine having an ambient air intake opening therein;
    a resonator fluidly attached to said air intake opening for attenuating noise caused by the flow of air into said intake opening; and
    a sound panel disposed in and substantially closing a bottom opening of said frame;
    wherein said resonator and said sound panel are disposed in the same plane.

2. An air conditioning system as set forth in claim 1 wherein said resonator and said sound panel are integrally formed.

3. An air conditioning system as set forth in claim 1 wherein said resonator is tubular in form.

4. An air conditioning system as set forth in claim 1 wherein said resonator is composed of a plastic material.

5. An air conditioning system as set forth in claim 2 wherein said integrally formed resonator and sound panel are comprised of a molded plastic material.

6. An air conditioning system as set forth in claim 1 and including an air filter fluidly connected to said engine and said resonator.

7. A method of reducing sound emanating from an air conditioning system having an internal combustion engine mounted within a frame and adapted to receive a flow of ambient air into its intake manifold, comprising the steps of:
    fluidly attaching a resonator to said air intake manifold and locating said resonator adjacent a bottom opening of said frame; and
    providing a sound panel within said frame bottom opening, said sound panel being co-located in the same plane with said resonator and substantially closing off said bottom opening.

8. A method as set forth in claim 7 and including the step of integrally forming said resonator and said sound panel.

9. A method as set forth in claim 8 and including the step of integrally forming is accomplished by vacuum molding of a plastic material.

10. In transport refrigeration system having disposed within a support frame, a compressor and a drive engine with an air intake manifold, a sound suppression system comprising:
    a resonator fluidly attached to said air intake manifold and disposed in a plane adjacent a bottom side of said supporting frame; and
    a planar panel disposed in said plane, in surrounding relationship with said resonator, so as to substantially close said frame bottom side.

11. A sound suppression system as set forth in claim 10 wherein said resonator and planar panel are integrally formed.

12. A sound suppression system as set forth in claim 10 wherein said resonator is tubular in form.

13. A sound suppression systems as set forth in claim 11 wherein said integrally formed resonator and planar panel is formed of a plastic material.

14. A sound suppression system as set forth in claim 13 wherein said integrally formed structure is comprised of a vacuum molded plastic material.

15. A sound suppression system as set forth in claim 10 and including an air cleaner fluidly connected to said engine and said resonator.

* * * * *